US008238907B2

United States Patent
Vikberg et al.

(10) Patent No.: US 8,238,907 B2
(45) Date of Patent: Aug. 7, 2012

(54) LOCATION DEPENDENT HANDLING OF MOBILE SUBSCRIBERS

(75) Inventors: Jari Vikberg, Jarna (SE); Tomas Nylander, Varmdo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 731 days.

(21) Appl. No.: 11/573,266

(22) PCT Filed: Aug. 2, 2004

(86) PCT No.: PCT/EP2004/008634
§ 371 (c)(1),
(2), (4) Date: Oct. 21, 2008

(87) PCT Pub. No.: WO2006/012908
PCT Pub. Date: Feb. 9, 2006

(65) Prior Publication Data
US 2009/0215448 A1 Aug. 27, 2009

(51) Int. Cl.
*H04W 4/00* (2009.01)
(52) U.S. Cl. .............. 455/433; 455/426.1; 455/435.1; 455/435.2; 455/461; 455/552.1; 379/207.15
(58) Field of Classification Search ............ 455/433, 455/426.1, 435.1, 461, 445, 435.2, 552.1; 379/207.15
See application file for complete search history.

(56) References Cited

U.S. PATENT DOCUMENTS

| | | | |
|---|---|---|---|
| 6,167,279 A * | 12/2000 | Chang et al. | 455/462 |
| 6,850,758 B1 * | 2/2005 | Paul et al. | 455/422.1 |
| 7,058,415 B2 * | 6/2006 | Bushnell et al. | 455/461 |
| 7,640,008 B2 * | 12/2009 | Gallagher et al. | 455/414.1 |
| 2004/0209615 A1 * | 10/2004 | Lamb et al. | 455/433 |
| 2004/0219948 A1 * | 11/2004 | Jones et al. | 455/552.1 |
| 2005/0111649 A1 * | 5/2005 | Belkin et al. | 379/211.02 |
| 2005/0119005 A1 * | 6/2005 | Segal et al. | 455/445 |
| 2005/0148353 A1 * | 7/2005 | Hicks et al. | 455/466 |
| 2005/0239461 A1 * | 10/2005 | Verma et al. | 455/435.1 |
| 2007/0293222 A1 * | 12/2007 | Vikberg et al. | 455/436 |

FOREIGN PATENT DOCUMENTS

| | | |
|---|---|---|
| EP | 1 207 708 A | 5/2002 |
| GB | 2 371 717 A | 7/2002 |

* cited by examiner

*Primary Examiner* — Kamran Afshar
*Assistant Examiner* — Mong-Thuy Tran

(57) ABSTRACT

A mobile communications network in which a home location register stores two dialed numbers for a mobile station, a first number for use in a licensed radio access network and a second number for use only in an unlicensed radio access network. The core network discontinues connection of a call to the mobile station when the call uses the second dialed number and the mobile station is not located in the unlicensed radio access network. The core network may route the discontinued call to voice mail or to another number.

10 Claims, 3 Drawing Sheets

LOCATION DEPENDENT HANDLING OF MOBILE SUBSCRIBERS

FIELD OF INVENTION

The invention relates to the field of mobile communication networks that are extended by unlicensed radio access networks. It has specific relevance to the different handling of calls in dependence of whether a called mobile station is connected to the unlicensed radio access network or another network.

BACKGROUND ART

In a cellular communication system, such as GSM, each mobile station is identified by an International Mobile Subscriber Identity (IMSI). There is also a public number associated with the IMSI called the Mobile Station International ISDN number or MSISDN. When the MSISDN number is dialled, the home location register (HLR) at which the mobile station is registered translates this number to the IMSI and provides further information about the current location of the mobile station enabling the call to be rerouted to the correct area of the network or even to another network.

It is possible that several different MSISDN numbers can be associated with the same IMSI in a home location register. However, once the IMSI has been identified, the handling of the call is identical in all cases. The unique entry to the IMSI is updated when a mobile station changes location.

Conventional cellular networks can be extended by adding access networks that utilise a low power unlicensed-radio interface to communicate with mobile stations. These access networks are designed to be used together with the core elements of a standard public mobile network and consist essentially of plug-in low-power unlicensed radio transceivers, or access points, each designed to establish an unlicensed radio link with a mobile station MS and a controller or interface node connecting the unlicensed radio transceivers with the mobile core network. Suitable unlicensed-radio formats include digital enhanced cordless telecommunications (DECT), wireless LAN and Bluetooth. An adapted mobile handset capable of operating over both the standard air interface (e.g. the Um interface) and the unlicensed-radio interface means that the subscriber requires only one phone for all environments. The access network is constructed so that the core elements, such as the mobile switching centers MSC, of the public mobile network views the interface node as a conventional base station controller BSC. Such an access network and the mobile station for use with this access network are described in European patent application No. EP-A-1 207 708.

When an unlicensed radio access network is used to provide access to conventional cellular communication networks, the same unique IMSI is used to identify the mobile station to provide seamless mobile services regardless of how the mobile station connects to the network. However, the normal MSISDN number is associated with higher tariffs for the calling party and the called subscriber also has to pay additional costs if the call needs to be routed to another network, as would be the case if the mobile station is used in another country. This is costly for the subscriber and reduces the attraction of an unlicensed radio access network. In many cases there is a need to prevent calls to a mobile via an unlicensed radio access network being redirected to other networks in order to avoid this extra cost.

SUMMARY OF THE INVENTION

It is thus an object of the present invention to enable calls to a mobile station in an unlicensed radio access network to be handled differently from calls to the same mobile station via a conventional access network.

The above object is achieved in a mobile communications network and a method for handling a call in accordance with the appended claims.

Specifically, the invention resides in a mobile communications network including a core network portion having a first switching node, a home location register connected to the first switching node and a first visitor location register connected to the first switching node and said home location register. The first home location register is adapted to identify stored subscriber identity information identifying a mobile station from a first dialled number and to output mobile station location information associated with the subscriber identity information in response to the dialled number. The mobile communications network further includes at least one unlicensed radio access portion adapted to communicate with mobile stations over an unlicensed-radio interface and to communicate with the first switching node over a predetermined licensed mobile network interface. In accordance with the present invention, the home location register is further arranged to identify stored subscriber information from a second dialled number, wherein the second number is reserved to connect to a mobile station via the unlicensed radio access network portion only. In addition, the core network is arranged to terminate a call using the second dialled number when a mobile station is not connected to the unlicensed radio access network.

The provision of a separate number for calling a mobile station via the unlicensed radio access network and arranging the core network and specifically the home location register to handle a call using this specific number only when the mobile station is within the unlicensed radio access network ensures that separate billing procedures can be used for subscribers to this access network. Specifically, since tariffs are commonly determined as a function of the dialled number of part of the dialled number the network where the call was initiated can apply a lower tariff.

In a particularly preferred embodiment of the invention, the home location register includes a first register portion containing the subscriber identity information associated with mobile station location information and addressable using the first dialled number and a second register portion containing the subscriber identity information associated with mobile station location information and addressable only using the second dialled number.

The provision of two home location register portions, each with an entry for the IMSI of the mobile subscriber, but one being addressable only by numbers for use in establishing a call via the a separate number simplifies the different handling of the call depending on the number dialled.

The impact on the core network portion is minimised when the mobile station location information contained in the second home location register portion always indicates an area defined by the first visitor location register, since only this node requires modification. With this embodiment, a call to the mobile station using the MSISDN number will cause the corresponding home location register to provide the current location of the mobile station so that the call can be paged by the registered visitor location register or rerouted to the appropriate network. A call to the mobile station using the unlicensed radio access number will address the local home location register. In this case if the mobile station is not connected to the unlicensed radio access network or to the conventional network covered by the same visitor location register VLR, a paging message will result in no connection.

The call can then be terminated in the desired manner, e.g. by voicemail, rerouting to another number or rerouted to the MSISDN number.

In order to save resources and prevent unnecessary paging of the mobile station when the mobile station has moved out of the area of the unlicensed radio access network, the first switching node and the first visitor location register can be configured to access said second home location register portion and be adapted to update the location information associated with the subscriber identity information in the second home location register portion upon receipt of mobility information from a mobile station identified by the subscriber identity information. The core network portion is also adapted to terminate a call when mobile station location information output by the second home location register portion in response to the second dialled number indicates that said mobile station is not connected to the unlicensed radio access network.

The same functionality can be obtained with minimal impact on the functionality of the nodes of the core network portion in accordance with a further embodiment of the present invention when the home location register includes a module adapted to receive location information output in response to the second dialled number and to terminate the call when the location information indicates that the mobile station is not connected to the unlicensed radio access network.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION OF THE DRAWINGS

Figure 1:
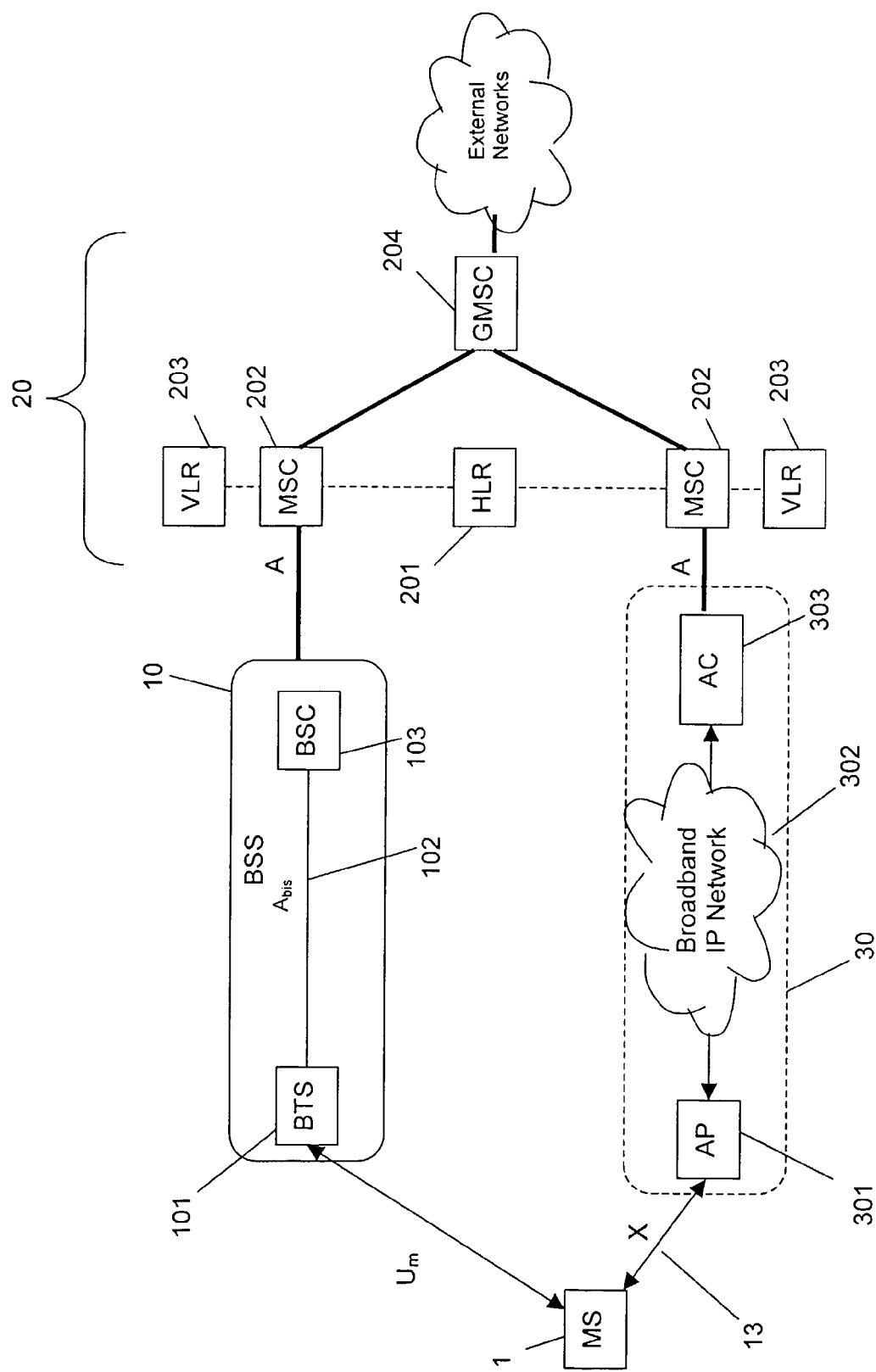
FIG. 1 schematically depicts parts of a GSM network with an unlicensed-radio access network, FIG. 2 schematically depicts a modified home location register consisting of two independent registers in accordance with the present invention, FIG. 3 schematically depicts a modified home location register consisting of a single register in accordance with a further embodiment of the present invention.

FIG. 1 schematically depicts parts of a conventional GSM network. This network is essentially divided into a core network portion 20 and an access portion also known as a base station subsystem BSS 10. The elements of the core network 20 illustrated in the figure include the mobile switching centers or MSCs 202, associated home location register HLR 201 and visitor location register VLR 203. The function and structure of these conventional GSM architecture elements are known to those skilled in the art and will not be described in further detail here. As illustrated symbolically in the figure the core network portion may include access to other mobile and fixed-line networks, such as ISDN and PSTN networks, packet and circuit switched packet data networks such as intranets, extranets and the Internet. Access to these external networks is provided through one or more gateway nodes called Gateway mobile service switching centres GMSC 204, one of which is illustrated in the figure.

The access portion essentially consists of base station subsystems BSS 10, one of which is illustrated in FIG. 1, which communicate via defined fixed standard A interfaces with MSCs 202 in the core network portion 20. Each base station subsystem BSS 10 includes a base station controller BSC 103 which communicates with one or more base transceiver stations BTS 101 via the defined $A_{bis}$ air interface 102. The base transceiver stations 101 communicate with mobile stations MS 1 over the GSM standard $U_m$ radio air interface. It will be understood that while the BTS 101 and BSC 103 are depicted as forming a single entity in the BSS 10, the BSC 103 is often separate from the BTSs 101 and may even be located at the mobile services switching centre MSC 202.

In addition to the standard access network portion provided by the BSS's 10 the network depicted in FIG. 1 further includes a modified access network portion 30 shown in the lower half of the figure. Hereinafter this will be described as an unlicensed-radio access network portion.

The components making up this unlicensed-radio access network portion 30 also enable the mobile station 1 to access the GSM core network portion, and through this, other communication networks via an unlicensed-radio interface X, represented in FIG. 1 by the bi-directional arrow 13. By unlicensed-radio is meant any radio protocol that does not require the operator running the mobile network to have obtained a license from the appropriate regulatory body. In general, such unlicensed-radio technologies must be low power and thus of limited range compared to licensed mobile radio services. This means that the battery lifetime of mobile stations will be greater. Moreover, because the range is low, the unlicensed-radio may be a broadband radio, thus providing improved voice quality. The radio interface may utilise any suitable unlicensed-radio protocol, for example a wireless LAN (W-LAN) protocol or Digital Enhanced Cordless Telecommunications (DECT). Preferably, however, Bluetooth radio is utilised, which has a high bandwidth and lower power consumption than conventional public mobile network radio.

The Bluetooth standard specifies a two-way digital radio link for short-range connections between different devices. Devices are equipped with a transceiver that transmits and receives in a frequency band around 2.45 GHz. This band is available globally with some variation of bandwidth depending on the country. Each device has a unique 48-bit address from the IEEE 802 standard. Built-in encryption and verification is also available.

The access network portion 30 is accessed via access points AP 301 that are adapted to communicate across the Bluetooth interface. Only one access point AP 301 is illustrated in FIG. 1, but it will be understood that many hundreds of these elements may be included in the unlicensed-radio access network 30. This element handles the radio link protocols with the mobile station MS 1 and contains radio transceivers that define a cell in a similar manner to the operation of a conventional GSM base station transceiver BTS 101. All communication via the access points AP 301 is controlled by an access controller AC 303, which communicates with a mobile service switching centre MSC 202 over the GSM standard A interface. The access controller AC 303 provides the connection between the MSC 202 and mobile station 1. The joint function of the access point AP 301 and the access controller AC 303 emulates the operation of the BSS 10 towards the MSC 202. In other words, when viewed from the elements of the core network 20 such as the mobile service switching centre MSC 202, the access network portion 30 constituted by the access points AP 301 and the access controller AC 303 looks like a conventional access network portion 10.

The interface between the access point AP 301 and the access controller AC 303 is provided by a packet-switched broadband network, which may be a fixed or a wireless network. The access point 301 is intended to be a small device that a subscriber can purchase and install in a desired location such as the home or an office environment to obtain a fixed access to the mobile network. However, they could also be installed by operators in traffic hotspots. In order to reduce the installation costs on the part of the operator, the interface between the access point 301 and the access controller 303 preferably exploits a connection provided by an already existing network 302.

Suitable networks might include those based on ADSL, Ethernet, LMDS, or the like. Home connections to such networks are increasingly available to subscribers while access points to such networks are becoming widespread in public and commercial buildings. Although not shown in FIG. 1, the access point AP 301 will be connected to a network terminal giving access to the network 302, while the access controller AC 303 may be connected to an edge router ER of the network 302 that also links the network 302 to other networks such as intranets and the internet. The Internet protocol, IP, is used for communication over the network 302 to render the transport of data independent of the network type.

The access point AP 301 may serve as a dedicated access point to the unlicensed-radio access network. In this case the access point AP 301 is capable of communicating independently with the mobile station 10 over the unlicensed-radio interface X or with the access controller 303 over the broadband network interface 302. The access point AP 301 utilises the standard protocols and functions to ascertain to which access controller AC 303 it should connect, and also to establish a connection and register with this access controller AC 303.

In an alternative embodiment, the access point 301 serves as an essentially transparent access point when viewed both from the access controller 303 and the mobile station 1. In other words, this access point relays all information at the IP level and above between the mobile station 1 and the access controller 303. It simply effects the conversion between the OSI reference model layer 1 and 2 unlicensed-radio and terrestrial access layer services. Accordingly, the mobile station 1 establishes a connection with the access controller 303 without recognising the access point as a node in the connection. Similarly the access controller 303 could establish a connection with the mobile station 1 directly.

The link between the mobile station MS 1 and the access controller AC 303 over the broadband IP network 302 is always open, so that this connection is always available without the need for reserving a channel. Specifically, a transport protocol is utilised that maintains a connection state between a mobile station MS 1 and the access controller AC 303. One suitable transport protocol is the Transmission Control Protocol (TCP), however, other protocols such as the User Datagram Protocol (UDP) or the Signalling Control Transfer Protocol could also be used. While the network 302 is preferably an IP-based network, ATM-based networks could also be used. In particular when DSL technologies are used in this network, they could be used directly on top of the ATM layer, since they are based on ATM. Naturally, an ATM based network could also be used to transport IP, serving as a base layer.

The applications that run on the mobile station MS 1 on top of the public mobile network radio interfaces also run on top of Bluetooth radio between the mobile station 1 and the access point AP 301.

The access point AP 301 is installed by plugging it in to a port of a suitable modem, such as an ADSL or CATV modem, to access the network 302. Alternatively, the access point AP 301 could be integrated in such a modem. The port is in contact with an intranet that is either bridged or routed on the IP level.

Figure 2:
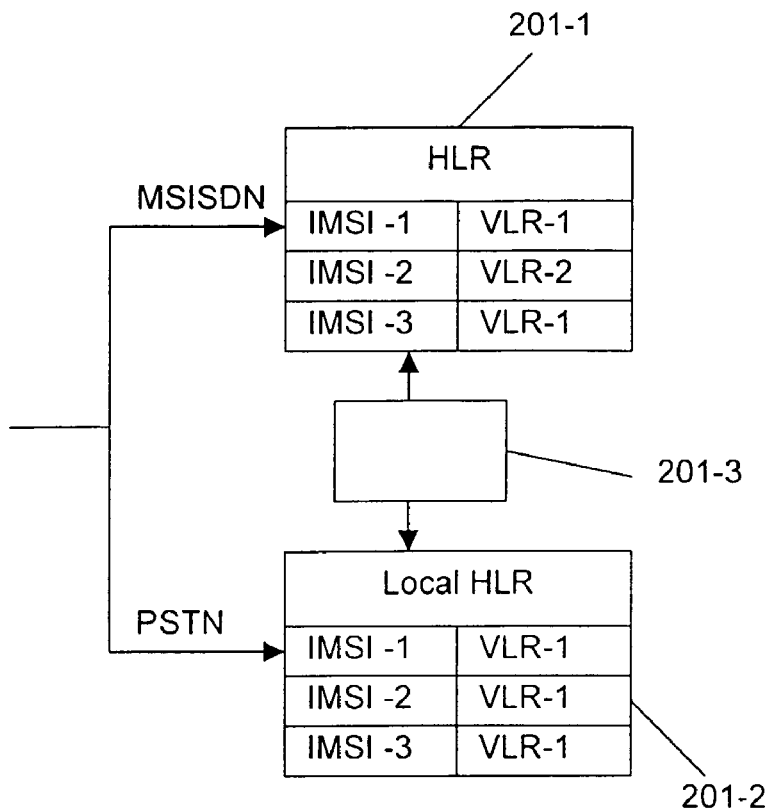

Turning now to FIG. 2 there is shown a modified home location register HLR 201 in accordance with the present invention. This home location register HLR consists of two independent registers a home location register HLR 201-1 and a local home location register HLR-2. These registers may be provided as separate physical nodes in the core network portion 20 or they may be contained in the same physical node but by logically separate. The IMSI of registered mobile stations is held in both registers 201-1 and 201-2. However, the location information associated with the IMSI, specifically the current visitor location register VLR 203 will not always be the same.

The home location register HLR 201-1 essentially acts like a conventional home location register in a GSM system. In other words, this register 201-1 contains the IMSI of all mobile stations registered with it and is able to translate the dialled MSISDN numbers to the appropriate IMSI. Associated with each IMSI is location information, specifically the identity of the visitor location register VLR 203 with which the mobile station 1 is currently registered. The home location register HLR 201-1 is updated by the connected mobile services switching center MSC 202 and visitor location register 203 on receipt of mobility information from the mobile station 1, such as a location area update or mobile detached message. In this way any calls using a MSISDN number that identifies the IMSI of a mobile station can be directed to the correct network cell or even to other operators networks if the mobile is used outside its home network.

The local home location register LHLR 201-2 contains the IMSI of all mobile stations registered with the mobile communications network via an unlicensed radio access portion 30. However, it does not translate from an MSISDN number but rather from one or more separate numbers for use with the unlicensed radio access network, hereinafter called the PSTN number. Moreover, the location information registered in association with the IMSI of a mobile station point only to the visitor location register VLR 203 provided for the unlicensed radio access network. This is indicated as VLR-1 in FIG. 2. However, the local home location register LHLR 201-2 is not updated when the mobile station 1 moves to different location areas, consequently, it will always point to the visitor location area VLR-1 203 associated with the home location area. In practice this means that a call using the PSTN number will be translated by the local home location area LHLR 201-2 to the IMSI with the associated location information for the local visitor location register VLR-1, regardless of the current location of the mobile station. The mobile station will then be paged in the unlicensed radio access portion 30 and in any conventional GSM cells served by the same visitor location register. If the mobile station is not present in this location area, the call will not be established and a no answer message will come back. The call can then be terminated in a manner chosen by the operator or the subscriber, for example, by forwarding to the voice mailbox or rerouting to another number.

When the mobile station is in the location area served by the local visitor location register VLR-1 203 both the home location register HLR 201-1 and the local home location register LHLR 201-2 will point towards the same local visitor location register VLR-1 203. A call made using either the MSISDN number or the PSTN number will result in the mobile station being located and paged in the home location area. This is illustrated in FIG. 2 for three different mobile stations 1 identified by three different IMSI, namely IMSI-1, IMSI-2 and IMSI-3. The mobile stations 1 assigned IMSI-1 and IMSI-3 are both located in the unlicensed radio access coverage area. The same local visitor location register VLR-1 is thus recorded in both the home location register HLR 201-1 and the local home location register LHLR 201-2. However, the mobile station 1 identified by IMSI-2 has roamed out of this area into an area covered by visitor location register VLR-2. This information has been updated in the home location register HLR 201-1, but since no update is possible to the local home location register LHLR 201-2, this register still shows the local visitor location register VLR-1.

The modified home location register HLR 201 described above with reference to FIG. 2 can be implemented without modification to standard mobile core network nodes and procedures. However, this arrangement does carry the disadvantage that when the PSTN number is dialled, the mobile station will always be paged within the zone covered by the local visitor location register VLR 203. In an alternative embodiment this disadvantage is alleviated by the modification of the behaviour of the mobile services switching center MSC 202 and visitor location register VLR 203 that serve the unlicensed radio access network. Specifically, the mobile services switching center MSC 202 and associated visitor location register VLR 203 would update both the home location register HLR 201-1 and the local home location register LHLR 201-2 when they receive mobility information, such as a location update or mobile detached message, from the mobile station 1.

In order to enable the updating of the local home location register LHLR 201-2, the address of this node must be configured in the mobile services switching center MSC 202 and visitor location register VLR 203. The normal home location register HLR 201-1 would continue to be addressed using the IMSI to determine the routing as in a conventional GSM core network. In this way, the location information associated with the dialled PSTN number would be correct, so that a call via this number to a mobile station 1 that is no longer located in the unlicensed radio access network can simply be terminated without the need to page the mobile.

As an alternative to modifying the function of the mobile services switching center MSC 202 and visitor location register VLR 203 the updating of both the home location register HLR 201-1 and the local home location register LHLR 201-2 may alternatively be performed by a single update function or module 201-3 between both home location registers 201-1, 201-2 as shown schematically in FIG. 2. Specifically, for each IMSI entry in the home location register HLR 201-1 that is duplicated in local home location register LHLR 201-2, and thus also associated with a PSTN number, the update module 201-3 sets a flag in the home location register HLR 201-1 and a local address or pointer to the local register stored. When a location update is received for the IMSI causing the updating of the home location register HLR 201-1 the update module 201-3 notes the flag and retrieves the local address of the local home location register LHLR 201-2 to enable updating of this register also. The updating of the local home location register LHLR 201-2 will take one of two forms. Specifically, if the new location received does not correspond to the local or home location, i.e. the local visitor location register VLR-1, then the IMSI is marked as detached and all calls using the PSTN number will be terminated. When the new location corresponds to the local or home location, i.e. the local visitor location register VLR-1, then the IMSI is marked as attached or connected and calls are forwarded as normal.

In a still further embodiment of the present invention, the home location register HLR 201-1 and local home location register LHLR 201-2 are combined in the same logical node with modified functionality. This modified home location register is illustrated in FIG. 3 and is denoted by the reference numeral 201-3.

Specifically, this modified home location register HLR 201 includes a register portion 2011 in which location information in the form of an identifier for the visitor location register with which the mobile station is currently registered is associated with the mobile station the IMSI. This register portion is addressable using either the MSISDN number or the PSTN number. The register portion 2011 is furthermore updated with the current mobile station location information by the mobile services switching center MSC 202 and visitor location register VLR 203 to which it is connected. Furthermore, this modified home location register 201-3 contains a functional module 2012 that determines whether the dialled number is the MSISDN number or the PSTN number and in the event that it is the PSTN number determines on the basis of the registered location information whether the mobile station should be paged in the local area or whether the call should be terminated. Specifically, if the location information indicates that the mobile station is currently located in the unlicensed radio access network, i.e. the location information points to the local visitor location register 203, the call will be put through. If the location information indicates that the mobile station has moved out of this area, the call may be terminated. If the dialled number is the MSISDN number, the module 2012 forwards the call to the visitor location register in the normal way.

Figure 3:
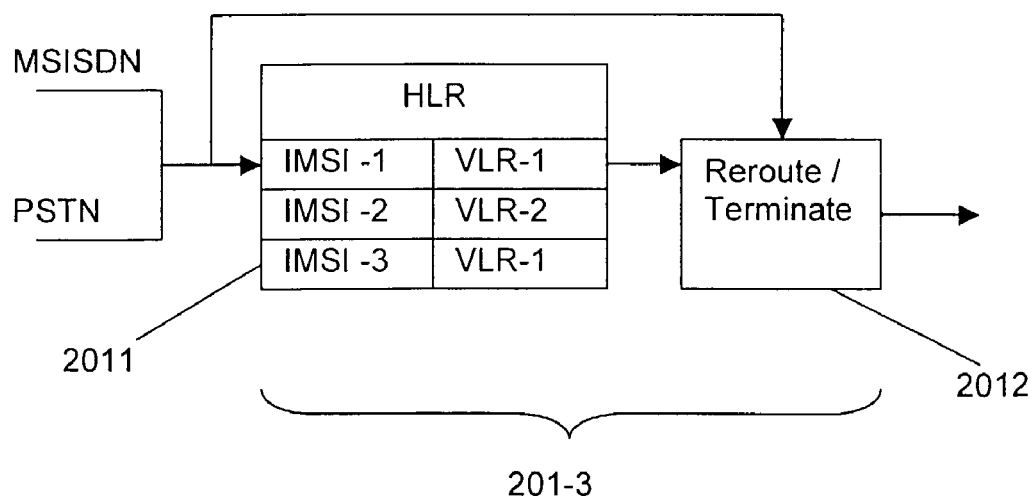
Figure 4:
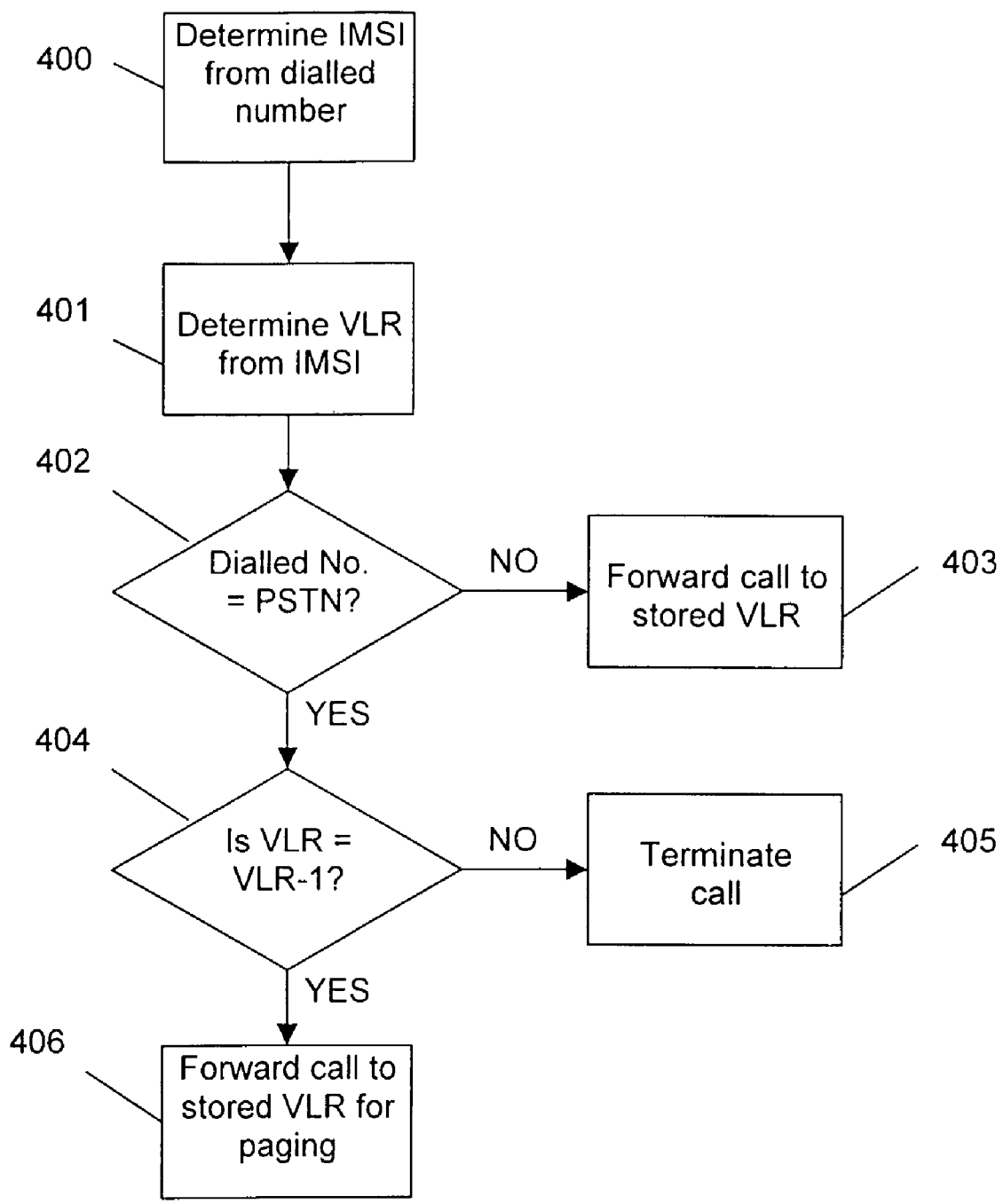
FIG. 4 is a flowchart illustrating the method of handling a call in accordance with the present invention.

The method performed by the home location register HLR 201 illustrated by FIG. 3 is illustrated in FIG. 4. The method starts at step 400 with the translation of the dialled number into the IMSI performed by the home location register HLR 201. At step 401, the location information, and specifically the visitor location register information associated with the IMSI is obtained. At step 402 it is determined whether the dialled number is the PSTN number. If not, the method passes to step 403 and the call is forwarded to the stored visitor location register VLR 203 associated with the IMSI in the normal manner for dialled MSISDN numbers. However, if the number is a PSTN number, the method passes to step 404, where it is determined whether the stored visitor location register corresponds to the local visitor location register VLR-1 that covers the unlicensed radio access network 30. If this is not the case, the call is terminated at step 405 in the manner chosen by the subscriber. This may include forwarding the call to voice mail, rerouting to another number or rerouting to the MSISDN number. If the stored location information does identify the local visitor location register VLR-1 203, the call is forwarded to this visitor location register VLR 203 for paging the mobile station within the unlicensed radio access network at step 406. This method with the exception of steps 402 and 403 is also applicable to the handling of a call by the mobile services switching center MSC 202, local visitor location register VLR 203 and home location register when this home location register is arranged as illustrated in FIG. 2 but wherein the second register portion 201-2 can be accessed to allow location updates as described above.

With the solution illustrated in FIGS. 3 and 4 it is possible to allow more flexibility in the handling of subscriptions via the unlicensed radio access network. For example, if the home location register indicates that mobile station location is registered with a visitor location register within the same operator's network, the call could be rerouted to this location. If, on the other hand, the mobile station 1 has roamed into another operator's network, e.g. is located in a different country, the call could then be terminated to prevent billing difficulties.

This embodiment avoids the need to modify the update procedures of the mobile services switching center MSC 202 and visitor location register VLR 203 and the associated need to configure a separate address for the local home location register LHLR.

The invention claimed is:

1. A mobile communications network comprising:
   a licensed radio access portion;
   a core network portion connected to the licensed radio access portion, said core network portion comprising:
   a first switching node;
   a home location register connected to said first switching node;
   a first visitor location register connected to said first switching node and said home location register, said home location register being adapted to identify from a first dialed number, stored subscriber identity information identifying a mobile station and to output mobile station location information associated with said subscriber identity information in response to said first dialed number, said first dialed number being utilized for connections to the mobile station via the licensed radio access portion; and
   at least one unlicensed radio access portion for communicating with mobile stations over an unlicensed-radio interface and for communicating with said first switching node over a predetermined licensed mobile network interface;
   wherein said home location register is further adapted to identify from a second dialed number, said stored subscriber information, said second number being reserved for connections to the mobile station via said unlicensed radio access network portion only;
   wherein said core network portion is adapted to:
   connect a call to the mobile station when the call utilizes the first dialed number;
   discontinue connection of the call to the mobile station when the call utilizes the second dialed number and the mobile station is not connected to said unlicensed radio access network; and
   connect the call to the mobile station when the call utilizes the second dialed number and the mobile station is connected to said unlicensed radio access network.

2. The mobile communications network as claimed in claim 1, wherein said home location register comprises:
   a first register portion addressable using said first dialed number, the first register portion containing the subscriber identity information associated with the mobile station location information; and
   a second register portion addressable only using said second dialed number, the second register portion containing the subscriber identity information associated with the mobile station location information.

3. The mobile communication network as claimed in claim 2, wherein the mobile station location information contained in said second home location register portion always indicates an area defined by said first visitor location register.

4. The mobile communications network as claimed in claim 2, further comprising a home location register update module for updating the location information associated with said subscriber identity information in said second home location register portion upon receipt of mobility information from the mobile station identified by said subscriber identity information;
   wherein said core network portion discontinues connection of the call to the mobile station when mobile station location information output by said second home location register portion in response to said second dialed number indicates that said mobile station is not connected to said unlicensed radio access network.

5. The mobile communications network as claimed in claim 2, wherein said first switching node and said first visitor location register are configured to access said second home location register portion and are further adapted to update the location information associated with said subscriber identity information in said second home location register portion upon receipt of mobility information from the mobile station identified by said subscriber identity information;
   wherein said core network portion discontinues connection of the call to the mobile station when mobile station location information output by said second home location register portion in response to said second dialed number indicates that said mobile station is not connected to said unlicensed radio access network.

6. The mobile communications network as claimed in claim 1, wherein said home location register includes a module for receiving location information output in response to said second dialed number and for discontinuing the call when said location information indicates that the mobile station is not connected to the unlicensed radio access network.

7. The mobile communications network as claimed in claim 1, wherein the core network portion is adapted to discontinue connection of the call to the mobile station by at least one of forwarding said call to voice mail and rerouting said call to another number.

8. A mobile communications network comprising:
   a licensed radio access portion;
   a core network portion connected to the licensed radio access portion, said core network portion comprising:
   a first switching node;
   a home location register connected to said first switching node;
   a first visitor location register connected to said first switching node and said home location register, said home location register having a first register portion adapted to contain subscriber identity information identifying a mobile station and mobile station location information associated with said subscriber identity information, wherein the home location register outputs the mobile station location information in response to a first dialed number;
   at least one unlicensed radio access portion for communicating with mobile stations over an unlicensed-radio interface and for communicating with said first switching node over a predetermined licensed mobile network interface;
   wherein said home location register further comprises a second register portion containing said subscriber identity information associated with mobile station location information and addressable only using a second dialed number, said second number being reserved for connections to said mobile station via said unlicensed radio access network portion only;
   wherein said core network portion is adapted to:
   connect a call to the mobile station when the call utilizes the first dialed number;
   discontinue connection of the call to the mobile station when the call utilizes the second dialed number and the mobile station is not connected to said unlicensed radio access network; and connect the call to the mobile station when the call utilizes the second dialed number and the mobile station is connected to said unlicensed radio access network.

9. The mobile communication network as claimed in claim 8, wherein the mobile station location information contained in said second home location register portion always indicates an area defined by said first visitor location register.

10. A method of handling a call in a mobile communications network, said mobile communications network having a core network portion, a licensed radio access network portion connected to the core network portion, and at least one unlicensed radio access network portion connected to said core network portion and adapted to communicate with mobile stations over an unlicensed radio interface, said method comprising the steps of:

determining a mobile station subscriber identity in response to a dialed number;

obtaining stored location information associated with said subscriber identity, said stored location information indicating the area of location of said mobile station;

determining whether said dialed number is for establishing a call to the mobile station via said licensed radio access network portion or said unlicensed radio access network portion;

when the dialed number is for establishing the call via said licensed radio access network portion, paging said mobile station in an area identified by said stored location information;

when the dialed number is for establishing the call via said unlicensed radio access network, determining whether the stored location information identifies an area covered by said unlicensed radio access network;

paging said mobile station in an area identified by said stored location information only if said stored location information identifies an area covered by said unlicensed radio access network; and discontinuing connection of the call to the mobile station when the dialed number is for establishing the call via said unlicensed radio access network and the location information identifies an area that is not covered by the unlicensed radio access network.

* * * * *

UNITED STATES PATENT AND TRADEMARK OFFICE
CERTIFICATE OF CORRECTION

PATENT NO. : 8,238,907 B2
APPLICATION NO. : 11/573266
DATED : August 7, 2012
INVENTOR(S) : Vikberg et al.

It is certified that error appears in the above-identified patent and that said Letters Patent is hereby corrected as shown below:

In Column 9, Line 55, in Claim 3, delete "communication" and insert -- communications --, therefor.

In Column 11, Line 5, in Claim 9, delete "communication" and insert -- communications --, therefor.

Signed and Sealed this
Thirteenth Day of November, 2012

David J. Kappos
*Director of the United States Patent and Trademark Office*